Patented Dec. 18, 1928.

1,696,075

UNITED STATES PATENT OFFICE.

HENRY BLUMENBERG, JR., OF LOS ANGELES, CALIFORNIA.

METHOD OF MINING BORON COMPOUNDS.

No Drawing.   Application filed October 24, 1927.   Serial No. 228,504.

My invention relates to a process of mining boron compounds, especially kernite ($Na_2B_4O_7$) containing from 2 to 4 molecules of water of crystallization, as compared with borax which contains 10 molecules of water. Kernite occurs in large underground deposits at several places in California and sometimes associated with calcium boron compounds, such as colemanite ($2CaO.3B_2O_3.5H_2O$) and ulexite ($Na_2O.2CaO.5B_2O_3.16H_2O$).

It is an object of this invention to provide a method whereby the kernite may be quickly and economically mined and my process is based on the discovery that when the kernite deposit is treated with a solvent under heat and pressure, preferably with an alkaline solution of the alkali metal salts or compounds, the kernite is rendered soluble by being converted into a meta-borate which may then be pumped or lifted to the surface of the ground and again treated to form borax which is crystallized out from the mixture and the remaining mother liquor containing the alkaline reagent is used in a new cycle of operation in dissolving the kernite.

My invention consists in the steps of the process hereinafter described and claimed.

In carrying out my process any suitable apparatus may be used whereby means are provided to force a hot solution of the reagent into the boron deposit underground, with means for lifting the dissolved boron minerals with the reagent from the deposit to apparatus above the ground for separating the mined borax and using the reagents recovered in a new cycle of operation. For instance an apparatus such as disclosed in my patent for process of mining insoluble boron compounds, Patent No. 1,636,456, granted July 19, 1927, or in my U. S. patent for a method of mining soluble boron compounds and the like, No. 1,649,385, granted Nov. 15, 1927 may be used.

I prepare a 5 to 15 percent solution of sodium carbonate and heat the same to 200 degrees F. or higher prior to its introduction to the kernite deposit, of which there are deposits in California at a depth of 800 feet. The sodium carbonate solution may, if desired, be further heated by the introduction of steam which may be conveyed by means of a pipe to the deposit. The sodium carbonate will cause the slowly soluble kernite to go into solution and will also disintegrate and render soluble to a large extent calcium boron compounds which may be associated with the kernite. The reaction taking place between the kernite and sodium carbonate is as follows:

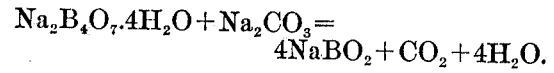
$Na_2B_4O_7.4H_2O + Na_2CO_3 =$
$4NaBO_2 + CO_2 + 4H_2O.$

It should be noted that the sodium meta-borate is formed, which is highly soluble, and which will not crystallize out even when the solution is of a gravity of 40° B. Ordinary borax is, as is well known, only slightly soluble in cold water and has a tendency to crystallize out from hot solution on being cooled, thereby causing considerable inconvenience in handling the borax solutions. I overcome this difficulty by converting the sodium borate into highly soluble meta-borate in addition to greatly increasing the solubility thereof.

As disclosed in my two patents above referred to, it is advisable to use the means described in said patents for maintaining the solution of the boron compounds, as they are being pumped up from the deposit to the surface of the ground, in a hot condition.

The solution is now treated with carbon dioxide in excess when the meta-borate is converted into normal borax in accordance with the following equation:

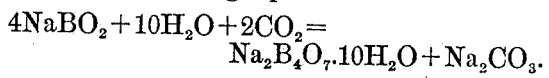
$4NaBO_2 + 10H_2O + 2CO_2 =$
$Na_2B_4O_7.10H_2O + Na_2CO_3.$

The borax, especially on cooling the mixture, will crystallize out and is removed by filtration or any other suitable means and the mother liquor containing sodium carbonate is used again in a new cycle of operation.

In place of sodium carbonate, bicarbonate may be used, also sodium hydroxide and the corresponding potassium compounds but sodium carbonate will be preferred on account of its economy.

It should also be noted that the solution of sodium carbonate reacting on the kernite of the deposit is under a hydrostatic head, increasing enormously the pressure which greatly facilitates the reaction of the reagent on the boron deposit.

As stated above, the best results are obtained by using an alkaline solution, however, my invention is not limited to the use of such solution but water alone as a solvent may be used. I have discovered that the kernite will go into solution in the form of a mixture of meta-borate and tetra-borate, in which condition it may be easily raised or pumped to the surface and treated in the same manner as when the alkaline solution is used.

Various changes may be made by those skilled in the art in the steps of the process as described and claimed.

I claim:

1. A process of mining deposits of boron compounds containing kernite comprising subjecting the deposit to an alkaline solution of a compound of an alkali metal to convert the kernite to an easily soluble meta-borate and causing said meta-borate to go in solution, and removing said solution from the deposit.

2. A process of mining deposits of boron compounds containing kernite comprising subjecting the deposit to a solution of sodium carbonate to convert the kernite to an easily soluble meta-borate and causing said meta-borate to go in solution, and removing the solution from the deposit.

3. A process of mining deposits of boron compounds containing kernite comprising subjecting the deposit to a solution of sodium carbonate under heat and pressure to convert the kernite to an easily soluble meta-borate and causing said meta-borate to go in solution, and removing the solution from the deposit.

In testimony whereof I have signed my name to this specification.

HENRY BLUMENBERG, Jr.